(12) United States Patent
Nagai et al.

(10) Patent No.: US 6,561,749 B1
(45) Date of Patent: May 13, 2003

(54) WORK SUCKING DEVICE

(75) Inventors: Shigekazu Nagai, Tokyo (JP); Masayoshi Yamamoto, Koshigaya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/856,154

(22) PCT Filed: Nov. 30, 1999

(86) PCT No.: PCT/JP99/06710

§ 371 (c)(1), (2), (4) Date: Jun. 1, 2001

(87) PCT Pub. No.: WO00/32362

PCT Pub. Date: Jun. 8, 2000

(30) Foreign Application Priority Data

Dec. 1, 1998 (JP) ............................ 10-342070

(51) Int. Cl.⁷ ................................. B25J 15/06
(52) U.S. Cl. ...................... 414/627; 414/797
(58) Field of Search ................. 414/935, 941, 414/627, 797; 423/449.1

(56) References Cited

U.S. PATENT DOCUMENTS

| | | | | |
|---|---|---|---|---|
| 3,056,317 A | * | 10/1962 | Huber et al. | 228/6.2 |
| 3,702,698 A | * | 11/1972 | Schweibel | 271/103 |
| 3,721,352 A | * | 3/1973 | Messmer | 414/627 |
| 3,765,542 A | * | 10/1973 | White | 414/627 |
| 3,834,558 A | * | 9/1974 | Bru | 294/64.1 |
| 4,537,450 A | * | 8/1985 | Baxter | 384/18 |
| 5,393,821 A | * | 2/1995 | Shieh et al. | 423/449.1 |
| 5,422,554 A | * | 6/1995 | Rohde | 29/429 |
| 5,430,088 A | * | 7/1995 | Ohashi et al. | 423/449.1 |
| 5,708,222 A | * | 1/1998 | Yonezawa et al. | 324/537 |
| 5,893,646 A | * | 4/1999 | Mizutani et al. | 384/43 |

FOREIGN PATENT DOCUMENTS

| | | | | |
|---|---|---|---|---|
| JP | 5-70630 A | * | 3/1993 | C08L/21/00 |
| JP | 10029182 A | * | 2/1998 | B25J/15/06 |

* cited by examiner

Primary Examiner—Eileen D. Lillis
Assistant Examiner—Charles A. Fox
(74) Attorney, Agent, or Firm—Paul A. Guss

(57) ABSTRACT

A workpiece sucking device comprises a buffering mechanism for absorbing shock generated when a workpiece is engaged/disengaged. The buffering mechanism includes a linear rail member which is fixed to a body and a slider which makes sliding movement along the rail member. A workpiece is prevented from rotating by an engagement of the slider with the rail member.

6 Claims, 4 Drawing Sheets

WORK SUCKING DEVICE

BACKGROUND OF THE INVENTION

1. Field of the Invention

The present invention relates to a workpiece sucking device for attracting and transporting a workpiece by using a suction member operated by a fluid sucking action under negative pressure.

2. Description of the Related Art

A suction device has hitherto been used which is installed with a suction pad as a means for attracting and transporting a workpiece. The suction device is provided with a buffering mechanism which functions as absorbing the shock generated when the workpiece is attracted by means of the suction pad or when the workpiece is disengaged from the suction pad.

Further, the suction device is provided with a rotation-preventive mechanism for preventing the workpiece from rotating when the workpiece attracted by the suction pad is transported.

In the above suction device, the buffering mechanism and the rotation-preventive mechanism are constructed as separate members respectively.

However, the above suction device has an inconvenience in that it cannot be miniaturized since the buffering mechanism and the rotation-preventive mechanism are separately provided respectively.

Furthermore, when a resin material is used for the suction device, a temperature condition limits an environment where the workpiece suction device can be installed. For example, it is difficult to use the suction device in an environment where the suction device is installed at a high temperature (for example, not less than 100° C.) or at a low temperature (for example, not more than 0° C.).

An object of the present invention is to provide a workpiece sucking device which can be miniaturized and which can be widely used in accordance with the temperature condition in the environment where the workpiece sucking device is installed.

SUMMARY OF THE INVENTION

A buffering mechanism according to the present invention functions as preventing the workpiece from rotating as well as absorbing the shock generated when a workpiece is engaged/disengaged, therefore allowing the workpiece sucking device to be miniaturized. Further, all of constitutive components including a retainer except for a suction member are made of metal materials. Accordingly, the workpiece sucking device can be widely used in accordance with a temperature condition in an environment where the workpiece sucking device is installed.

Preferably, a suction pad functioning as the suction member is formed of conductive fluorine-based rubber composed of vulcanized fluorine-based rubber and carbon black.

DETAILED DESCRIPTION OF THE PREFERRED EMBODIMENTS

Figure 1:
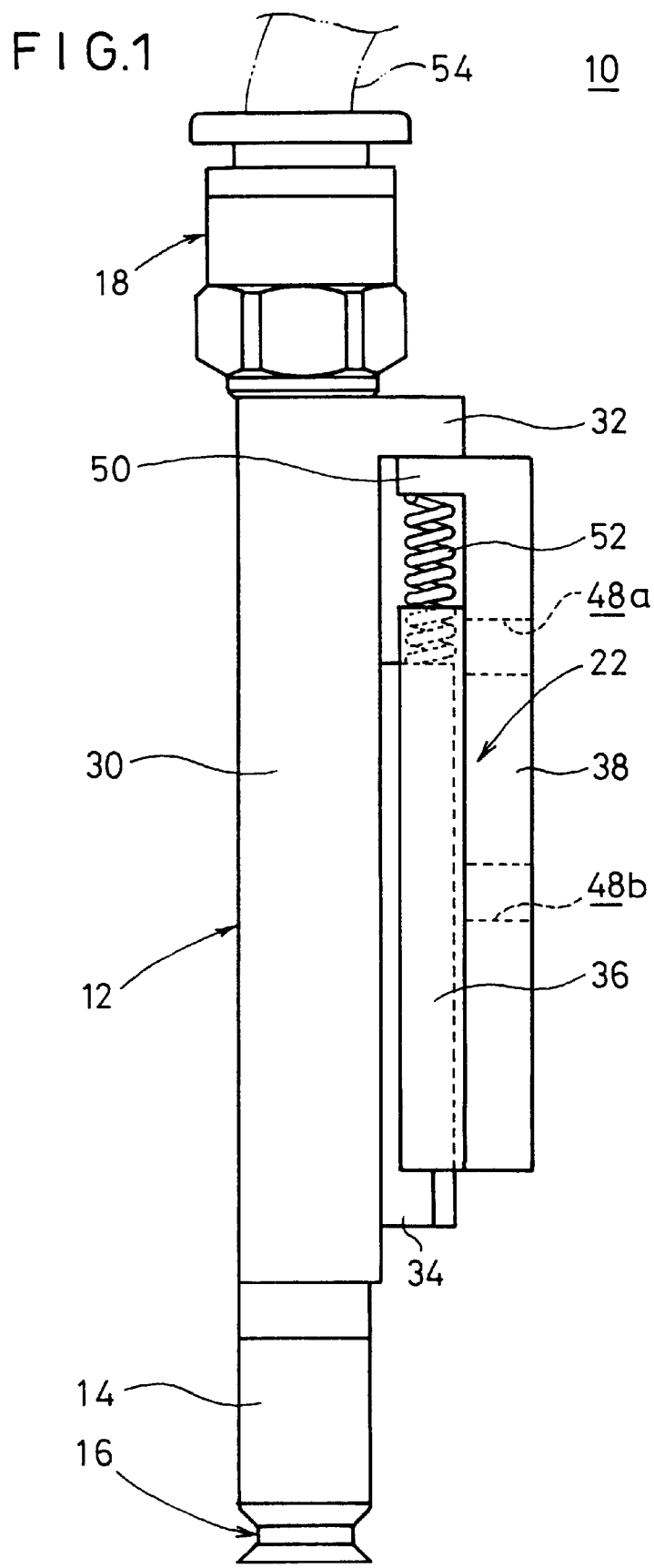
FIG. 1 shows a front view illustrating a workpiece sucking device according to an embodiment of the present invention.

In FIG. 1, reference numeral 10 indicates a workpiece sucking device according to an embodiment of the present invention.

The workpiece sucking device 10 comprises a body 12 which is formed with a hole (not shown) penetrating therethrough in the axial direction, a suction pad (suction member) 16 which is installed to the lower end of the body 12 by the aid of a connector 14, and a joint member 18 which is connected to the-upper end of the body 12 and which is formed with a port (not shown) communicating with the hole.

The body 12 has a buffering mechanism 22 provided at a side portion thereof. The buffering mechanism 22 absorbs the shock generated when a workpiece 20 (see FIG. 2) is engaged/disengaged and prevents the workpiece 20 from rotating while it is transported. All of constitutive components except for the suction pad 16 are made of metal materials.

Figure 4:
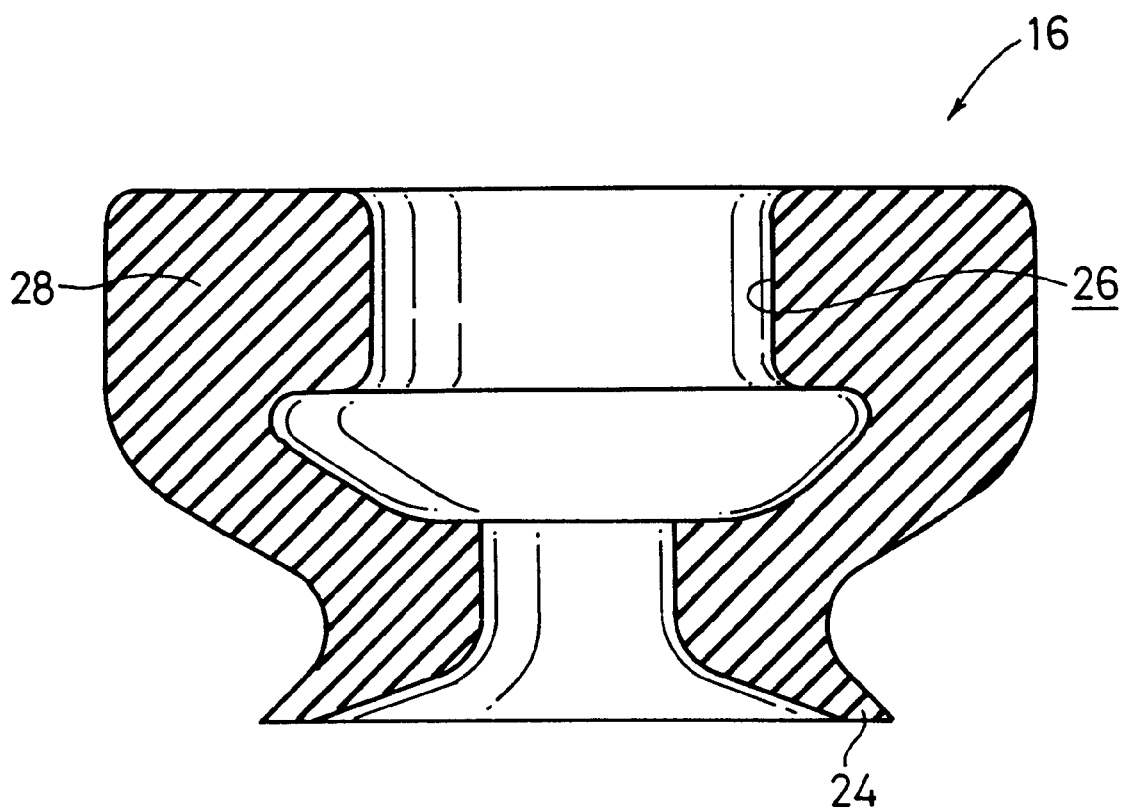
FIG. 4 shows a vertical sectional view illustrating a suction pad which constitutes the workpiece sucking device shown in FIG. 1.

The suction pad 16 is formed of, for example, conductive fluorine-based rubber. As shown in FIG. 4, the suction pad 16 includes a thin-walled skirt section 24 contacting with the workpiece 20, and a connecting section 28 formed integrally with the skirt section 24 and having a hole 26 connected to the connector 14.

The body 12 has a cylindrical member 30. The cylindrical member 30 has an unillustrated through-hole formed at the inside thereof. The through-hole is a passage for allowing a fluid under negative pressure to flow therethrough. A stopper section 32 protruding outwardly by a predetermined dimension is formed at the end of the cylindrical member 30.

Figure 3:
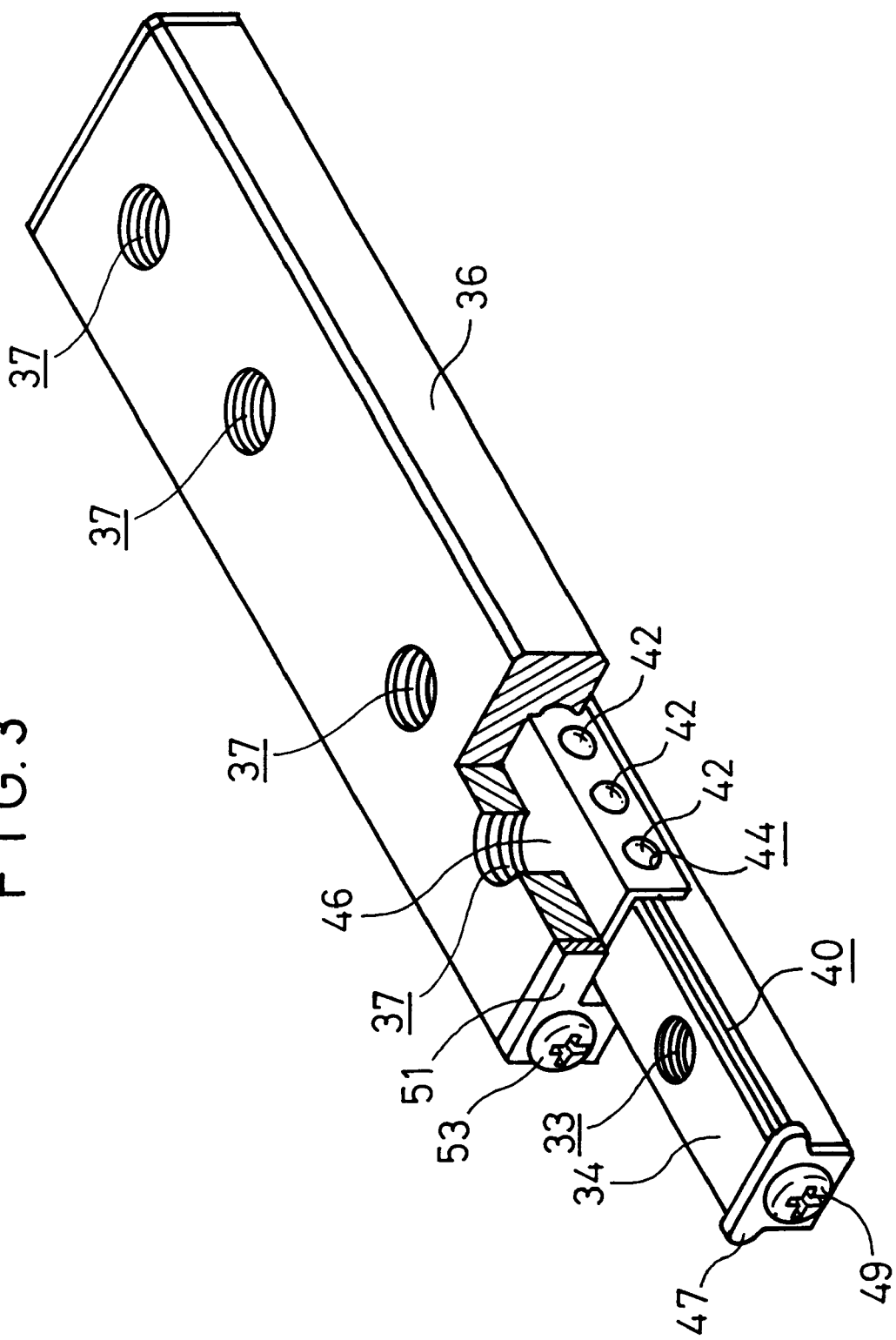
FIG. 3 shows, with partial cutaway, a perspective view illustrating the rail member and the slider which constitute a buffering mechanism.

As shown in FIG. 3, the buffering mechanism 22 includes a rail member 34 which is fixed to the side of the body 12 by the aid of unillustrated screw members to be inserted into attachment holes 33, a slider (slide member) 36 which is provided linearly displaceably along the rail member 34 in accordance with the guiding action of the rail member 34, and a connecting member 38 which is fixed to the slider 36 by the aid of unillustrated screw members to be inserted into attachment holes 37 and which is displaceable integrally with the slider 36.

As shown in FIG. 3, a plurality of balls 42 and a retainer 46 are disposed between the rail member 34 and the slider 36. The plurality of balls 42 roll along rolling grooves 40 formed at the sides of the rail member 34. The retainer 46 rollably retains the balls 42 in circular holes 44. The retainer 46 is secured to the slider 36 and is displaceable integrally with the slider 36. All parts of the buffering mechanism 22 including the retainer 46 are made of metal materials.

A stopper plate 47 preventing the slider 36 from disengaging from the rail member 34 is connected to the end of the rail member 34 by the aid of a screw member 49. A cover member 51 fastening the retainer 46 is connected to the end of the slider 36 by the aid of screw members 53.

In this arrangement, it is preferable that lubricating oil, which does not generate dust so much and which can be used in a wide temperature range (for example, a range from −40° C. to 200° C.), is applied, for example, to the sliding surfaces of the rolling grooves 40 and the balls 42 retained by the retainer 46 and to the sliding surfaces of the rail member 34 and the slider 36.

Figure 2:
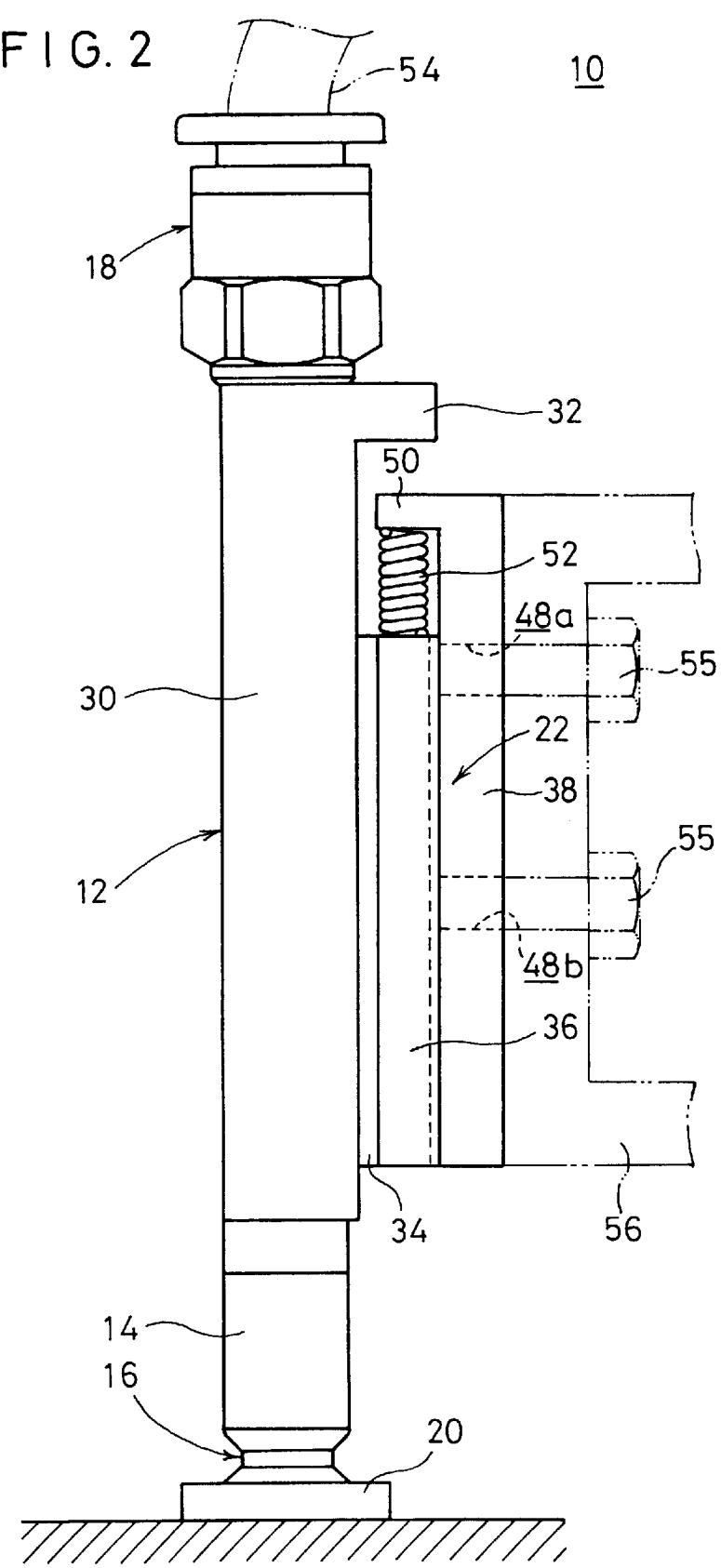
FIG. 2 illustrates the operation depicting a state in which a slider and a connecting member are displaced along a rail member from the initial positions shown in FIG. 1.

As shown in FIG. 2, the connecting member 38 is formed with a pair of attachment holes 48a, 48b which are separated from each other by a predetermined distance. The workpiece sucking device 10 can be fixed to an unillustrated robot arm 56 by the aid of fastening members 55 screwed into the attachment holes 48a, 48b from the side of the arm 56 as described later on.

The connecting member 38 has a projection 50 formed at the end thereof. The projection 50 abuts against the stopper section 32 which is provided for the body 12 to restrict the displacement of the connecting member 38. A spring 52 is fastened between the projection 50 and the rail member 34. The projection 50 is urged in a direction of separating from the first end of the rail member 34 in accordance with the action of the resilient force of the spring 52. That is, the projection 50 is urged so that it abuts against the stopper section 32. The shock generated when the workpiece 20 is engaged/disengaged is absorbed by the aid of the resilient force of the spring 52. The first end of the spring 52 is fastened to the rail member 34, and the second end of the spring 52 is fastened to the projection 50.

The joint member 18 is composed of a so-called one-touch joint, and it is connected to an unillustrated negative pressure supply source via a tube 54 which is inserted into the port. The fluid under negative pressure which is supplied from the negative pressure supply source is introduced into the suction pad 16 via the unillustrated through-hole of the body 12.

The workpiece sucking device 10 according to the embodiment of the present invention is basically constructed as described above. Next, its operation, function, and effect will be explained. The following description will be made assuming that the state shown in FIG. 1 resides in the initial position.

At first, the rail member 34 is connected to the side of the body 12 by screwing the unillustrated screw members into the attachment holes 33 formed for the rail member 34. Subsequently, the unillustrated screw members are screwed into the attachment holes 37 formed for the slider 36 to fix the connecting member 38 to the slider 36. Further, the fastening members 55 are screwed into the attachment holes 48a, 48b formed for the connecting member 38 to fix the workpiece sucking device 10, for example, to the first end of the robot arm 56.

The workpiece sucking device 10 is then moved downwardly in accordance with the displacement action of the robot arm 56 to attract the workpiece 20 by the aid of the suction pad 16. During this process, as shown in FIG. 2, the connecting member 38 and the slider 36 are integrally moved downwardly along the rail member 34 against the resilient force of the spring 52. The projection 50 of the connecting member 38 is separated from the stopper section 32. Accordingly, the shock generated in attracting the workpiece 20 can be absorbed by the resilient force of the spring 52.

After the workpiece 20 is attracted by using the suction pad 16 which is operated by a fluid sucking action under negative pressure, the robot arm 56 is displaced, and the workpiece sucking device 10 is moved upwardly to a predetermined position. Accordingly, the initial position is restored where the projection 50 abuts against the stopper section 32 in accordance with the resilient force of the spring 52 (see FIG. 1).

After attracting the workpiece 20, the robot arm 56 is rotated in a predetermined direction. The rotary action of the robot arm 56 is stopped at a predetermined position. Further, the workpiece sucking device 10 is moved downwardly in accordance with the displacement action of the robot arm 56. Accordingly, the workpiece 20 can be transported and positioned at a predetermined position.

The transported workpiece 20 is prevented from rotating by the engagement between the rail member 34 and the slider 36. That is, the rail member 34 and the slider 36 as the guide means simultaneously possess the function of preventing the workpiece 20 attracted by the suction pad 16 from rotating so that the workpiece 20 may not be disengaged from the suction pad 16. Accordingly, it is possible to stably transport the workpiece 20.

In other words, the slider 36 is provided displaceably only in the axial direction of the rail member 34 in accordance with the balls 42 rolling along the rolling grooves 40. The slider 36 is provided not to make rotation about the axial center of the rail member 34. Accordingly, the function of preventing the slider 36 from rotating is achieved.

Since the slider 36 is smoothly displaced linearly along the rail member 34 in accordance with the rolling action of the balls 42, no backlash is generated even if the workpiece sucking device 10 is used for a long period. Accordingly, the transported position of the workpiece 20 can be determined highly accurately.

Further, all of the constitutive components except for the suction pad 16 are formed of the metal materials. Accordingly, the,workpiece sucking device 10 can be widely used in accordance with the temperature condition in the environment where the workpiece sucking device 10 is installed.

For example, when the workpiece 20 is an IC chip, it is necessary for the suction pad 16 to be formed of a conductive material for the following reason. That is, if the suction pad 16 is formed of a non-conductive material, the current of the charged IC chip flows out of the IC chip, therefore resulting in destroying the IC chip.

Furthermore, since the energized IC chip is at a relatively high temperature, it is necessary for the suction pad 16 to resist the heat of the IC chip.

As a conductor excellent in resisting the heat, conductive silicone rubber composed of silicone rubber and carbon black can be used. The conductive silicone rubber has been widely used as a material for a suction pad. However, since the conductive silicone rubber is inferior in durability, a problem arises that the conductive silicone rubber used for the suction pad cannot be durable for repeatedly attracting and transporting the workpiece.

The suction pad 16 of the workpiece sucking device 10 according to the embodiment of the present invention is composed of conductive fluorine-based rubber. The conductive fluorine-based rubber is a composite material composed of vulcanized fluorine-based rubber and carbon black.

The strength and the heat resistance of the fluorine-base rubber are greatly improved by means of vulcanization. That is, the vulcanized fluorine-based rubber makes excellent the strength, the durability, and the heat resistance for the conductive fluorine-based rubber. However, it is impossible to sufficiently obtain the durability and the heat resistance in the suction pad produced by using non-vulcanized fluorine-based rubber.

Carbon black itself is an excellent conductor, therefore being a component which brings about the conductivity for the conductive fluorine-based rubber.

The ratio between the fluorine-based rubber and carbon black is set such that the suction pad 16 has the heat resistance, the durability, and the electric conductivity as desired.

The suction pad 16 incorporated in the workpiece sucking device 10 according to the embodiment of the present invention can be produced as follows.

At first, the fluorine-based rubber, a vulcanizing agent for the fluorine-based rubber, and carbon black are uniformly mixed at a predetermined ratio to prepare a mixture.

Subsequently, the mixture is heated and maintained at about 180° C. for about 10 minutes (primary vulcanization). Further, after the temperature of the mixture is raised stepwise to about 230° C., it is maintained and heated for about 24 hours (secondary vulcanization). During the heating processes, the fluorine-based rubber is vulcanized by the vulcanizing agent. Furthermore, the vulcanized fluorine-based rubber and carbon black are formed in a composite way. The conductive fluorine-based rubber is thus obtained. As described above, the stepwise processes of increasing and constantly maintaining the temperature of the mixture are performed. Accordingly, it is possible to avoid cracks which would be otherwise caused by expanded gas components that are generated in vulcanizing the conductive fluorine-based rubber.

Finally, the suction pad 16 is produced by shaping the conductive fluorine-based rubber according to a known shaping method.

The suction pad 16 produced as described above is excellent in the heat resistance, the electric conductivity and the durability. Therefore, the IC chip is not harmfully influenced even when it is repeatedly attracted and transported at the high temperature for a long period. Accordingly, the durability of the suction pad 16 can be improved to a greater extent.

The buffering mechanism according to the present invention functions as preventing the workpiece from rotating as well as absorbing the shock generated when the workpiece is engaged/disengaged. Accordingly, the workpiece sucking device can be miniaturized since it is unnecessary to provide respective members separately.

In the present invention, all of the constitutive components except for the suction pad to function as the suction member are formed of the metal materials. Accordingly, the workpiece sucking device can be widely used in accordance with a temperature condition in an environment where the workpiece sucking device is installed.

What is claimed is:

1. A workpiece sucking device for attracting and transporting a workpiece by means of a suction member operated by a fluid sucking action under a negative pressure, said device comprising:

a body for supporting said suction member; and a buffering mechanism provided at a side portion of said body, for absorbing shock generated when said workpiece is engaged/disengaged, wherein:

said buffering mechanism includes a linear rail member which is fixed to an external surface of said body in an axial direction of said body and a slide member which is slidably displaceable along said rail member, and said workpiece is prevented from rotating by means of an engagement of said slide member with said rail member, wherein said buffing mechanism includes a connecting member which is displaceable integrally with said slide member, and a spring member which is installed between a projection of said connecting member and an end of said rail member.

2. The workpiece sucking device according to claim 1, wherein a plurality of balls for making rolling movement along a rolling groove of said rail member and a retainer formed with holes for rollably holding said balls are provided between said rail member and said slide member, and all constitutive components of said workpiece sucking device including said retainer except for said suction member are formed of metal materials.

3. The workpiece sucking device according to claim 1, wherein all constitutive components of said workpiece sucking device except for said suction member are formed of metal materials.

4. The workpiece sucking device according to claim 1, wherein said suction member is composed of a suction pad, and said suction pad is formed of conductive fluorine-based rubber composed of vulcanized fluorine-based rubber and carbon black.

5. The workpiece sucking device according to claim 1, wherein a stopper section, which makes abutment against a projection of said slide member to regulate displacement of said slide member, is provided at one end of said body in said axial direction.

6. The workpiece sucking device according to claim 1, wherein said body is composed of a cylindrical member formed with a hole penetrating in said axial direction, a joint member for being connected to a tube is connected to a first end of said cylindrical member in said axial direction, and said suction member is coaxially connected via a connector to a second end of said cylindrical member in said axial direction.

* * * * *